US012811475B2

(12) United States Patent
Neet

(10) Patent No.: US 12,811,475 B2
(45) Date of Patent: Nov. 24, 2026

(54) CASCADED WINDING WITH MULTIPLE WEAVES

(71) Applicant: BorgWarner Inc., Auburn Hills, MI (US)

(72) Inventor: Kirk Neet, Noblesville, IN (US)

(73) Assignee: BorgWarner Inc., Auburn Hills, MI (US)

(*) Notice: Subject to any disclaimer, the term of this patent is extended or adjusted under 35 U.S.C. 154(b) by 924 days.

(21) Appl. No.: 17/875,568

(22) Filed: Jul. 28, 2022

(65) Prior Publication Data

US 2024/0039378 A1 Feb. 1, 2024

(51) Int. Cl.
*H02K 15/043* (2025.01)
*H02K 3/12* (2006.01)

(52) U.S. Cl.
CPC ........... *H02K 15/0433* (2025.01); *H02K 3/12* (2013.01)

(58) Field of Classification Search
CPC .. H02K 15/0433; H02K 3/12; H02K 15/0421; H02K 2213/03; H02K 3/28; H02K 1/16
See application file for complete search history.

(56) References Cited

U.S. PATENT DOCUMENTS

| | | | | |
|---|---|---|---|---|
| 6,882,077 | B2 | 4/2005 | Neet | |
| 7,269,888 | B2 | 9/2007 | Neet | |
| 7,687,954 | B2 | 3/2010 | Neet et al. | |
| 11,038,391 | B2 | 6/2021 | Neet | |
| 2018/0034334 | A1* | 2/2018 | Neet | H02K 3/28 |
| 2018/0241267 | A1* | 8/2018 | Neet | H02K 1/165 |
| 2020/0395804 | A1* | 12/2020 | Ahmed | H02K 3/14 |

* cited by examiner

*Primary Examiner* — Christopher M Koehler
*Assistant Examiner* — Riley Owen Stout
(74) *Attorney, Agent, or Firm* — Maginot, Moore & Beck, LLP

(57) ABSTRACT

A stator for an electric machine includes a stator core having a plurality of slots formed therein and a multi-phase winding arrangement positioned on the stator core. The winding arrangement includes a plurality of cascaded conductors arranged in layers of the slots, the layers defining multiple layer pairs. The plurality of cascaded conductors form a plurality of parallel paths per phase, each of the parallel paths making multiple revolutions of the core with each revolution occurring within a layer pair. For each layer pair, a number of weaves (N) are formed between a first parallel path and a second parallel path in said layer pair, wherein N is greater than or equal to two.

20 Claims, 4 Drawing Sheets

CASCADED WINDING WITH MULTIPLE WEAVES

FIELD

The present disclosure relates to the field of electric machines, and more particularly, stator winding arrangements and connections for such winding arrangements.

BACKGROUND

Electric machines are designed to meet specific operating requirements that depend at least in part on the intended application for the electric machine. Examples of design features that contribute to operating performance include stator size, rotor size, type and arrangement of the windings, and any of various other design parameters as will be recognized by those of ordinary skill in the art. All operating requirements for the electric machine must be met while also meeting certain space constraints that are also dependent upon the intended application for the electric machine.

In some applications, designers will strive to reduce the number of electrical conductor terminations and connections in the stator assembly, as a need to physically connect conductors in the stator core assembly adversely impacts cost and complexity of the manufacturing process. To this end, some stator windings utilize continuous conductor paths, including those having a square or rectangular cross-section for use in high-slot-fill, multi-phase stator winding configurations. Each such continuous conductor path includes a series of straight conductor segments disposed in respective slots of the stator core, which straight conductor segments are interconnected by end loop segments that project axially from either end of the core. In at least some winding arrangements, the end loop segments are readily formed of first and second legs that extend first radially-outwardly and then radially-inwardly, respectively, to thereby permit successive straight segments to reside in a common layer of different slots of the stator core, thereby providing a “cascaded” winding configuration.

Cascaded windings typically feature some radial transition of each conductor path between layers. However, because these transitions present significant manufacturing challenges and costs, these transitions are typically limited. Different connection challenges are encountered by designers depending on the winding features and the type of winding. For example, for a specific winding arrangement, it is often challenging to make special connections between certain winding segments between different layers, different paths, and/or those associated with different coils. When making such connections, care must be taken to maintain the desired operating requirements, including good balance between winding phases, while also maintaining the winding within the desired size constraints.

In view of the forgoing, it would be desirable to provide an electric machine with a cascaded winding arrangement having a high slot-fill-ratio and excellent phase balance, while also maintaining the desired size constraints. It would also be desirable to make such connections without compromising other operating requirements. Furthermore, it would be advantageous for such winding arrangement to be configured such that it is relatively easy and economical to manufacture a stator that includes the winding arrangement.

While it would be desirable to provide an electric machine that provides one or more of these or other advantageous features as may be apparent to those reviewing this disclosure, the teachings disclosed herein extend to those embodiments which fall within the scope of any eventually appended claims, regardless of whether they accomplish one or more of the above-mentioned advantages.

SUMMARY

A stator for an electric machine includes a stator core having a plurality of slots formed therein and a multi-phase winding arrangement positioned on the stator core. The winding arrangement includes a plurality of cascaded conductors arranged in layers of the slots, the layers defining multiple layer pairs. The plurality of cascaded conductors form a plurality of parallel paths per phase, each of the parallel paths making multiple revolutions of the core with each revolution occurring within a layer pair. For each layer pair, a number of weaves (N) are formed between a first parallel path and a second parallel path in said layer pair, wherein N is greater than or equal to two.

In at least one embodiment, the winding arrangement of the stator defines a plurality of poles and includes a plurality of cascaded conductors arranged in layers of the slots. The layers of the slots define a plurality of layer pairs including at least a first layer pair and a second layer pair. The cascaded conductors form a plurality of parallel paths per phase in each of the layer pairs. A first plurality of weaves are formed between the parallel paths in the first layer pair, wherein said first plurality of weaves are associated with multiple poles of the plurality of poles including a first pole and a second pole. A second plurality of weaves are formed between said plurality of parallel paths in the second layer pair, wherein said second plurality of weaves also associated with the first pole and the second pole.

In at least one embodiment, the multi-phase winding arrangement includes a plurality of cascaded conductors arranged in layers of the slots, the layers defining multiple layer pairs. The plurality of cascaded conductors form a plurality of parallel paths per phase, each of the parallel paths making multiple revolutions of the core with each revolution occurring within a layer pair. For each layer pair, a first weave and a second weave are formed between a first parallel path and a second parallel path in said layer pair. The first weave is associated with a first pole of the plurality of poles, and the second weave is associated with a second pole of the plurality of poles. The first pole and the second pole are 180° opposite one another on the stator core.

DESCRIPTION

A stator for an electric machine is disclosed herein and includes a stator core with a winding arrangement positioned thereon. In at least one embodiment, the winding arrangement includes four cascaded parallel paths per phase, wherein each parallel path is associated with an adjacent cascaded parallel path and a complementary cascaded parallel path. The winding arrangement includes multiple weaves of complementary parallel paths within each layer pair. In at least one embodiment, four weaves of cascaded parallel paths are formed within each layer pair, per phase. For each weave of a layer pair, one cascaded parallel path switches layers with its complementary parallel path.

Stator Core

Figure 1:
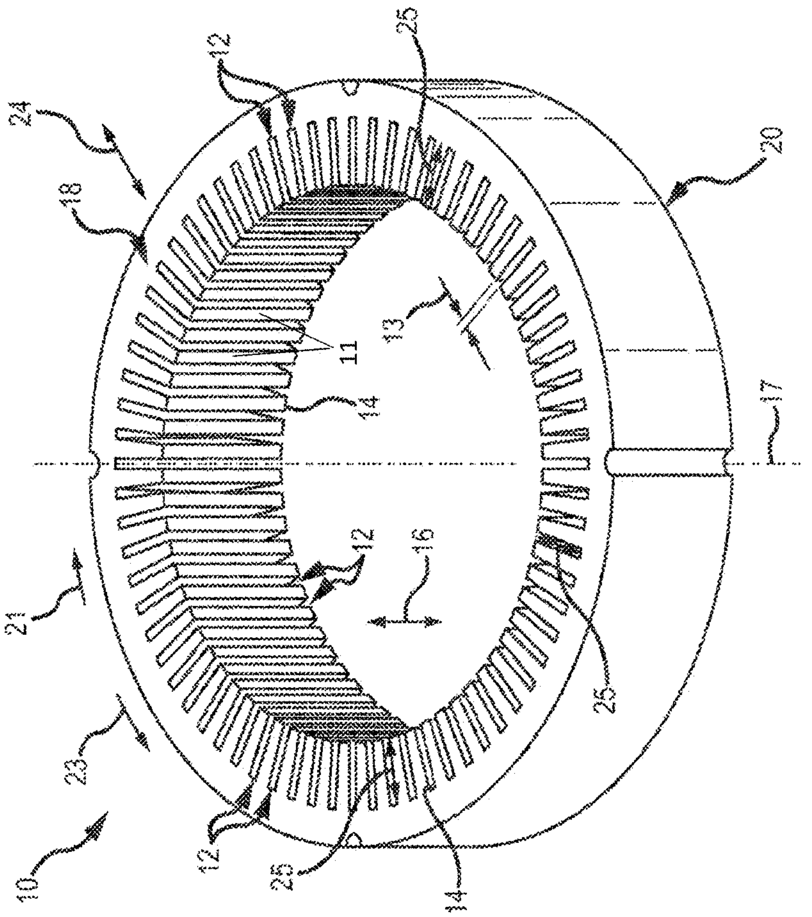
FIG. 1 shows a perspective view of a stator core for an electric machine winding.

Referring now to FIG. 1, a stator includes a generally cylindrically-shaped stator core 10. The stator core includes a plurality of core slots 12 formed in a circumferential interior surface 14 thereof. The core slots 12 are formed between radially inward extending teeth 11, and extend in an axial direction, indicated by an arrow 16, parallel to the central axis 17 of the stator core 10 between a first end 18 and a second end 20 thereof. The core slots 12 are equally spaced around the circumferential inner surface 14 of the stator core 10 and the respective inner surfaces 14 of the core slots 12 are substantially parallel to the central axis 17. A circumferential clockwise direction is indicated by an arrow 21 and a circumferential counterclockwise direction is indicated by an arrow 23. The core slots 12 define a width 13, defined along a circumferential direction, and a depth 25 along a radial axis, indicated by an arrow 24, and are adapted to receive a stator winding 70, discussed in more detail below. A radial inward direction is defined as moving towards the central axis 17 of the stator core 10 and a radial outward direction is defined as moving away from the central axis 17.

Winding Conductors

Figure 2:
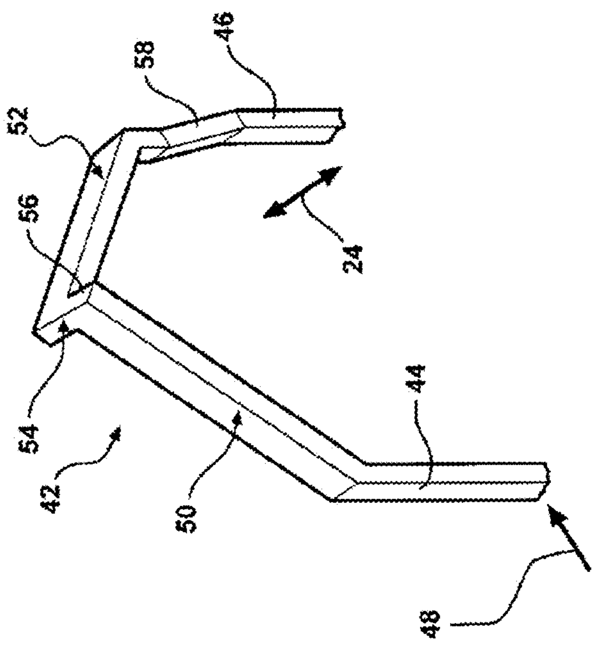
FIG. 2 shows an exemplary conductor of an electric machine winding for use in association with the stator core of FIG. 1.

Referring now to FIG. 2, an end loop segment 42 is shown, which end loop segment 42 is part of a conductor path within a cascaded winding arrangement provided on the stator core 10. The end loop segment 42 (which may also be referred to herein as an "end loop" or alternatively an "end turn") extends between a first substantially straight segment 44 and a second substantially straight segment 46 (which may also be referred to herein as an "in-slot segment"), each of which extends through a different slot 12 of the stator core 10. The first straight segment 44 and the second straight segment 46 are joined by the end loop 42 and are at a same radial distance from the central axis 17 of the stator core 10. Accordingly, the first straight segment 44 and the second straight segment 46 reside in an exemplary common layer 48 of the core slots 12, wherein a "layer" refers to a position of a conductor within the slot between an inner diameter and an outer diameter of the stator core (e.g., there are eight layers, 1-8, in a slot when eight conductors are arranged in a single file within the slot).

The end loop 42 includes a first sloped portion 50 and a second sloped portion 52 that meet at an apex portion 54. The first sloped portion 50 is substantially co-radial with the common layer 48, the first straight segment 44 and the second straight segment 46. The second sloped portion 52 is substantially non-co-radial with the common layer 48, the first straight segment 44 and the second straight segment 46. The apex portion 54 includes a first radial extension portion 56. The first radial extension portion 56 extends from the first sloped portion 50 in the radially outward direction, which provides a radial outward adjustment for the end loop 42. A second sloping radial extension portion 58 connects the second sloped portion 52 and the second straight 46. The second radial extension portion 58 extends from the second sloped portion 52 in the radially inward direction, which provides a radial inward adjustment for the end loop 42.

While the end loop 42 has been shown wherein the radial outward adjustment is adjacent the apex portion 54 and the radial inward adjustment is adjacent the second sloped portion 52, it will be recognized that this is but one embodiment of an end loop segment that may be used in association with the cascaded winding arrangement described in further detail below. Those skilled in the art can appreciate that the radial outward and inward adjustments can be on any one or on any two of the first sloped portion 50, the second sloped portion 52, and the apex portion 54 in order to provide the cascaded winding pattern. Moreover, it will be recognized that other arrangements of the end loop 42 are possible in order to provide the cascaded winding pattern disclosed herein.

Figure 3:
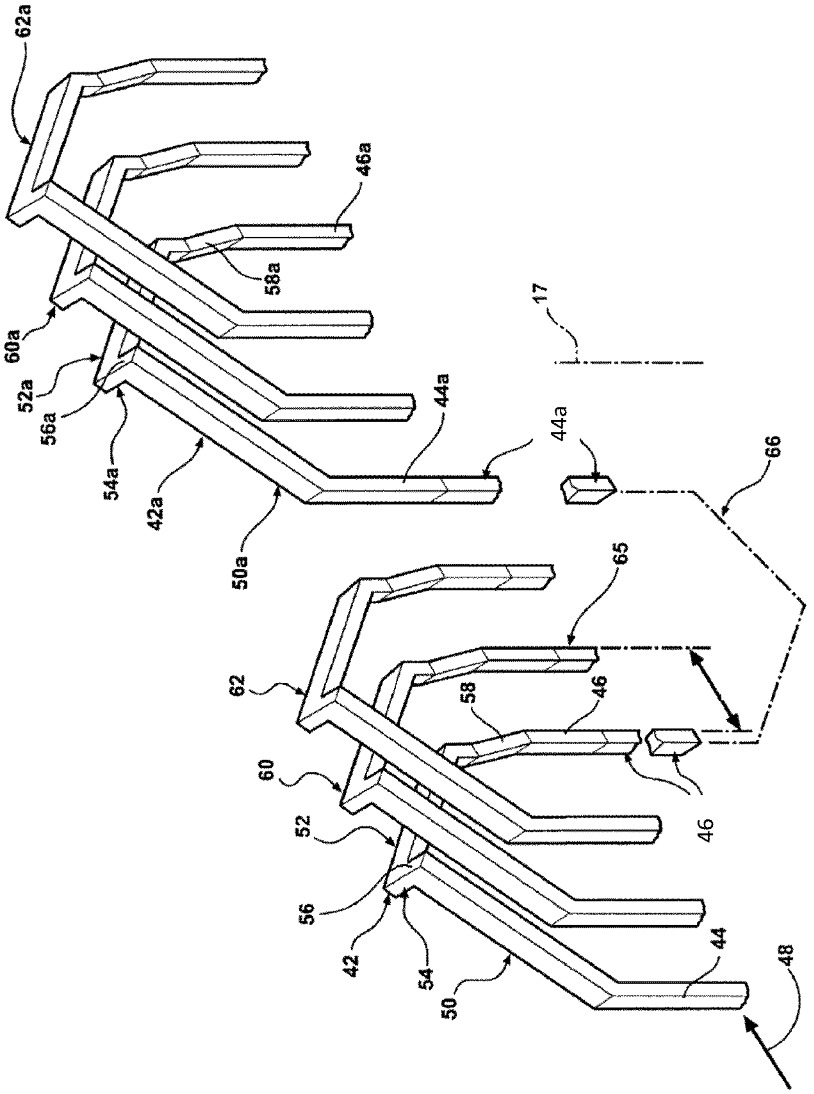
FIG. 3 shows the arrangement shows the conductor of FIG. 2 in association with other conductors as part of a cascaded winding arrangement.

Referring now to FIG. 3, the end loop 42 of FIG. 2 is shown adjacent a plurality of substantially identical end loops, indicated generally at 60 and 62. The end loops 42, 60, and 62 are shown in a three-phase winding pattern but those skilled in the art will appreciate that the end loops 42, 60, and 62 may be formed in, for example, a six-phase winding pattern, or any other winding pattern advantageous for producing electricity or for generating torque, as in the case of an electric motor. The end loops 42, 60, and 62 are each disposed at an end 18 or 20 of the stator core 10.

The straight segment 46 extends through a one of the core slots 12 from the first end 18 to the second end 20 of the stator core 10. As the first straight segment 46 exits the second end 20, the first straight segment 46 is attached to an end of another end loop, shown schematically at 66, which is substantially identical to the end loops 42, 60, and 62. The end loop 66 is attached at another end to a second straight segment, shown schematically at 44. The second straight segment 44 extends upwardly through another one of the core slots 12 of the stator core 10 and attaches to a portion **44*a* of another end loop 42*a*, which is substantially identical to the end loop segments 42, 60, and 62. Similarly, the end loop segment 42*a* connects to another straight segment 46*a* and returns to the opposite end of the stator core 10. The pattern of connecting end loop segments 42, 66, and 42*a* and straight segments, such as the straight segments 44, 46, 44*a*, 46*a*, as outlined above, continues throughout one substantial pass (i.e., a revolution) about the circumference of the stator core 10**. Thereafter, each conductor path may transition to additional layers and make one or more additional passes around the stator core, as explained in further detail below.

As will be recognized from FIGS. 2 and 3, the end loops 42 and straight segments 44, 46 are assembled to form a cascaded winding arrangement, and particularly the cascaded winding arrangement described in further detail below with reference to FIGS. 4A-4C. In at least some embodiments, the cascaded winding arrangement may be provided by a continuous length of wire having a rectangular cross-sectional shape. However, other shapes may also be employed such as round or square. For those skilled in the art, it is known that typical rectangular or square shaped conductors may include radii on the corners intermediate two adjacent edges. Additionally, those skilled in the art will recognize that, instead of a winding path formed from a continuous length of wire, the conductors used to form the various paths of the winding arrangement may be provided by segmented conductors, sometimes referred to as "hair-pin" conductors, which are inserted at one end of the stator core and welded together or otherwise joined on the opposite end of the stator core to form a complete cascaded winding arrangement. Examples of other cascaded winding arrangements include those disclosed in U.S. Pat. Nos. 6,882,077, 7,269,888, 7,687,954, and 11,038,391, the contents of which are all incorporated herein by reference in their entirety.

Winding Arrangement

Figure 4A:
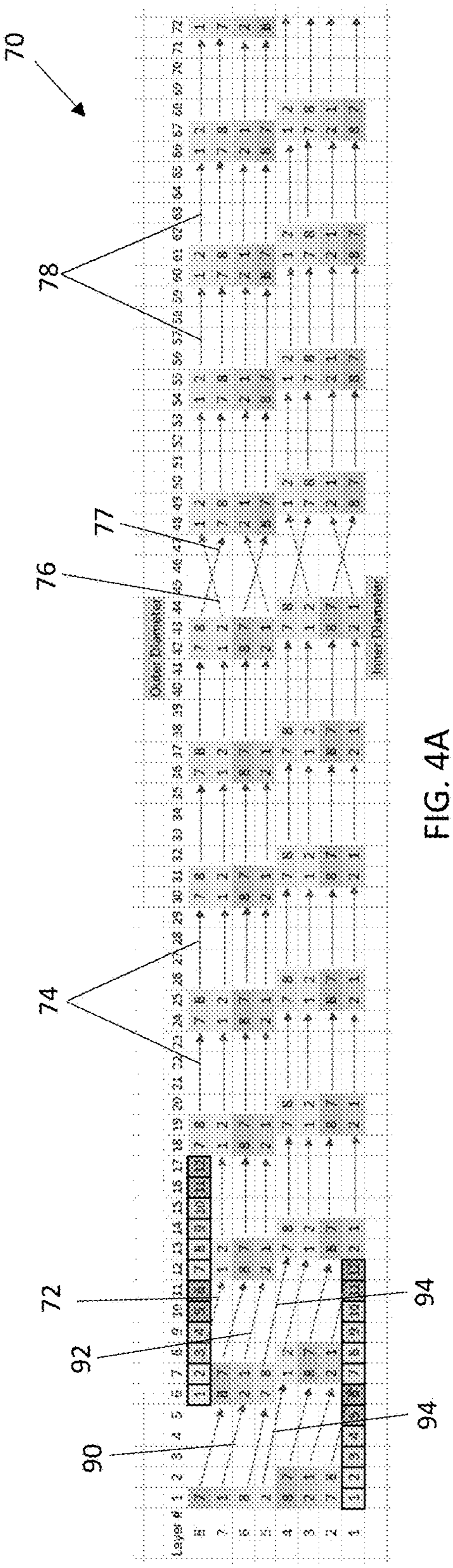
FIG. 4A shows a schematic view of a cascaded winding arranged in slots 1-72 of the stator core of FIG. 1.
Figure 4B:
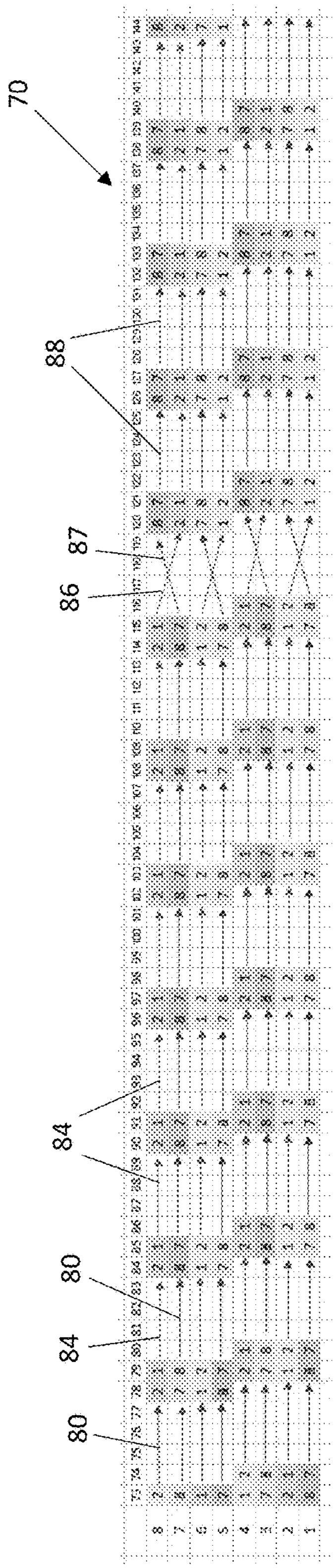
FIG. 4B shows a schematic view of the cascaded winding of FIG. 4A arranged in slots 73-144.
Figure 4C:
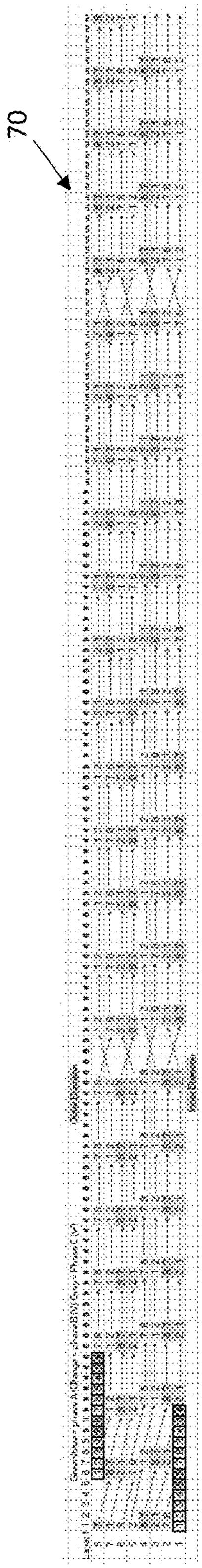
FIG. 4C shows a unified schematic view of the winding of FIGS. 4A and 4B arranged in slots 1-144 of the stator core.

With reference now to FIGS. 4A-4C, a tabular schematic diagram of a multi-phase cascaded winding 70 is shown. The winding 70 is positioned on a stator core 10 having one hundred and forty four (144) slots. The complete schematic for one phase of the winding, including all 144 slots, is shown in FIG. 4C. The schematic of FIG. 4C is split into two parts in FIGS. 4A and 4B for the sake of a more convenient illustration of the winding. FIG. 4A shows the winding arrangement for slots 1-72 of the stator core, and FIG. 4B shows the winding arrangement for slots 73-144 of the stator core. The winding 70 is a three phase winding, but only one phase of the winding is illustrated in FIGS. 4A-4C for the sake of clarity. It will be recognized that the two additional phases of the winding that are not show in FIGS. 4A-4C are essentially identical to the illustrated phase and occupy the positions in the slots with only blank squares.

With particular reference now to FIGS. 4A and 4B, the tabular schematic diagram includes slot numbers 1-144 noted along the top row of the table. The tabular diagram also includes layers one through eight (1-8) noted along the leftmost column of the table. Each box within the tabular schematic diagram represents a particular slot of the stator core 10 and a particular layer within the slot. Each number within a box identifies the position of a conductor for an associated path of the winding arrangement. For example, the numeral "2" in layer five of row thirty (30) identifies path 2 as residing at this position within the stator core 10. The arrows between the boxes represent end loops that connect the identified paths. For example, the horizontal arrow arranged in layer eight between slots 30-31 and 36-37 represents (i) a first end loop that connects the path 7 conductor in layer eight of slot 30 to the path 7 conductor in layer eight of slot 36, and (ii) a second end loop that connects the path 8 conductor in layer eight of slot 31 to the path 8 conductor in layer eight of slot 37.

As noted above, the conductors of the winding 70 are arranged in eight (8) layers within the slots. Each phase of the winding 70 includes four parallel paths and each parallel path makes four revolutions around the stator core. The leads to each of the paths are illustrated in FIGS. 4A and 4B by the bold boxes in layers 1 and 8 of the slots. Numerals 1, 2, 7 and 8 illustrate the four parallel paths of a first phase (e.g., phase U). Numerals 3, 4, 9 and 10 illustrate the four parallel paths of a second phase (e.g., phase V). Numerals 5, 6, 11 and 12 illustrate the four parallel paths of a third phase (e.g., phase W). Thus, it will be recognized that the winding 70 of FIGS. 4A and 4B includes twelve total paths, including four parallel paths for each phase of the three phase winding.

The winding 70 of FIGS. 4A and 4B is comprised of mostly cascaded conductors. The term "cascaded conductors" as used there refers to conductors having end loop segments configured to permit successive straight segments to reside in a common layer of different slots of a stator core. Stated differently, a cascaded conductor path is one wherein most of the end loops within the path connect a straight segment in one layer with a straight segment in the same layer. The term "cascaded winding" refers to a winding arrangement on a stator core wherein most of the conductors forming the winding are cascaded conductors. The term "cascaded parallel paths" refers to two parallel paths of one phase of a cascaded winding. The term "adjacent cascaded parallel paths" refers to two cascaded parallel paths having straight segments that reside in neighboring (i.e., adjacent) slots (e.g., paths 1 and 2 are adjacent cascaded parallel paths in the winding arrangement of FIGS. 4A and 4B). The term "layer pair" refers to two neighboring (i.e., adjacent) layers wherein the cascaded conductors make a complete (or substantially complete) revolution around the stator core within said two neighboring layers. In the winding 70 of FIGS. 4A and 4B, a first layer pair is provided by layers one and two, a second layer pair is provided at layers three and four, a third layer pair is provided at layers five and six, and a fourth layer pair is provided at layers seven and eight. The term "complementary cascaded parallel paths" refers to two cascaded parallel paths having straight segments that reside in opposite layers of a layer pair at all poles of the layer pair. Stated differently, at a given pole and layer pair, a given cascaded parallel path does not reside in the same layer as its complementary cascaded parallel path (e.g., paths 1 and 7 are complementary cascaded parallel paths in the winding 70 of FIGS. 4A and 4B).

The winding 70 of FIGS. 4A and 4B is now described in further detail by tracing exemplary cascaded parallel path 1 through the stator core. As shown in FIG. 4A by the bold box with the numeral "1," a first lead for path 1 is provided at layer eight of slot six. After extending through the core 10 at layer eight of slot 6, an end loop 72 causes path 1 to jump from layer eight to layer seven, and path 1 then extends through the core at layer seven of slot 12. A series of cascaded end loops 74 then cause path 1 to move successively through layer seven in each of slots 18, 24, 30, 36 and 42.

After extending through the core at layer seven of slot 42, a weave end turn 76 causes path 1 to return back to layer eight at slot 48. Together weave end turn 76 and weave end turn 77 form a weave of two conductor paths that results in complementary cascaded parallel paths 1 and 7 switching layer positions (i.e., weave end turn 76 results in path 1 moving to layer eight and weave end turn 77 results in path 7 moving to layer seven, wherein paths 1 and 7 are complementary cascaded parallel paths). Accordingly, the term "weave" as used herein refers to an end loop configuration that results in one cascaded parallel path switching layers with a complementary cascaded parallel path within a given layer pair. A weave is considered to be "associated with a pole" when the weave occurs in association with an end loop extending between said pole and an adjacent pole of the phase.

With continued reference to FIG. 4A, following end turn 76, path 1 extends through the core at layer eight of slot 48. Thereafter, a series of cascaded end loops 78 cause path 1 to move successively through layer eight in each of slots 54, 60, 66 and 72. As shown in FIG. 4B, an over-under end turn arrangement 80 then cause path 1 to switch positions with path 2 within layer eight. As noted previously, path 2 is an adjacent cascaded parallel path with path 1, and the two paths remain adjacent following the left/right position switch (i.e. path 1 moves from the left side of path 2 at slots 72-73 to the right side of path 2 at slots 78-79). The over-under end turn arrangement 80 is provided by a seven pitch end turn for path 1 (moving the path from slot 72 to slot 79) and a five pitch end turn for path two (moving the path from slot 73 to slot 78).

With continued reference to FIG. 4B, following the over-under end turn arrangement 80, path 1 extends through the core at layer eight of slot 79. Thereafter, a series of cascaded end loops 84 cause path 1 to move successively through slots 79, 85, 91, 97, 103, 109 and 115. After extending through the core 10 at layer eight of slot 115, a weave end turn 86 causes path 1 to return to layer seven from layer eight. Again, this weave end turn 86 is part of a weave formed by weave end turns 86 and 87. This weave results in complementary cascaded parallel paths 1 and 7 to switch layer positions (i.e., the weave results in path 1 moving to layer seven and path 7 moving to layer eight).

Following end turn 86, path 1 extends through the core at layer seven of slot 121. Thereafter, a series of cascaded end loops 88 cause path 1 to move successively through layer seven in each of slots 127, 133, 139 and 1 (see FIG. 4A for the placement of path 1 at layer seven of slot 1). At this point, path 1 has completed a revolution of the stator core (i.e., by virtue of the path extending completely around the core or substantially around the core such that the path is associated with all of the poles of the phase). As shown in FIG. 4A, a transition end turn 90 then causes path 1 to move from the outermost layer pair (i.e., layers seven and eight) to the middle-outer layer pair (i.e., layers five and six). In particular, this end turn 90 moves path 1 from layer seven of slot 1 to layer six of slot 7. After extending through the core 10 at layer six of slot 7, an end loop 92 causes path 1 to jump from layer six to layer five, and path 1 then extends through the core at layer five of slot 13.

With path 1 now in middle outer layer pair (i.e., layers five and six), the path completes another revolution of the stator core, similar to that described in the preceding paragraphs. The complete trace of path 1 is not described in detail herein for the sake of brevity, however, it will be recognized that the trace through the middle-outer layer pair is substantially similar to the trace through outermost layer pair. Accordingly the trace of path 1 through the middle-outer layer pair includes numerous cascaded end turns that allow path 1 to remain in the same layer in successive slots (similar to end turns 74, 78, 84 and 88), two end turns that are associated with weaves allowing complementary cascaded parallel paths 1 and 7 to switch layer within the layer pair (similar to end turns 76 and 86), and one over-under end turn arrangement (similar to over-under arrangement 80) that causes adjacent cascaded parallel paths 1 and 2 to switch left and right positions.

After completing another revolution of the stator core in the middle-outer layer pair (i.e., layers five and six), path 1 is then moved to the middle-inner layer pair (i.e., layers three and four). This is accomplished by one of the long pitch end turns 94 shown in FIG. 4A, which are all seven pitch end turns for the embodiment of the winding 70 disclosed herein. For path 1, the long pitch end turns 94 move the path from layer five of slot 144 to layer four of slot 7. It will be recognized that these long pitch end turns 94 are responsible for the 4-8-4 pole pattern disclosed herein. In particular, the long pitch end turns 94 shift each of the four paths of a given phase (e.g., path 1, path 2, path 7 and path 8 illustrated in FIGS. 4A-4C) one slot to the right when transitioning from the middle-outer layer pair to the middle-inner layer pair. As a result, each pole defined by the winding extends across three slots and includes four conductors in a left slot, eight conductors in a middle slot, and four conductors in a right slot (i.e., a 4-8-4 pole pattern).

Following the long pitch end turns 94, path 1 continues with another revolution of the core in the middle-inner layer pair. Again, this revolution around the core is similar to that described previously in association with the outermost layer pair. Accordingly the trace of path 1 through the middle-inner layer pair includes numerous cascaded end turns that allow path 1 to remain in the same layer in successive slots (similar to end turns 74, 78, 84 and 88), two end turns that are associated with weaves allowing complementary cascaded parallel paths 1 and 7 to switch layer with the layer pair (similar to end turns 76 and 86), and one over-under end turn arrangement (similar to over-under arrangement 80) that causes adjacent cascaded parallel paths 1 and 2 to switch left and right positions.

After completing the revolution of the core in the middle-inner layer pair, path 1 then transitions to the inner most layer pair (i.e., layers 1 and 2). Again, this revolution around the core is similar to those described previously. Finally, path 1 terminates at layer one of slot 1, where another lead is provided to the path (as indicated by the bold box around path 1). This completes the trace for path 1, which includes four revolutions around the stator core and two weaves per revolution. Paths 2, 7 and 8 are parallel paths of the same phase as path 1. The traces of these paths are similar to that of path 1. While these traces have not been described in detail herein for the sake of brevity, the exact traces of these paths is evident from the tabular schematic diagram of FIGS. 4A and 4B.

In view of the foregoing, it will be recognized that the winding arrangement disclosed herein includes a cascaded winding arrangement including multiple weaves for each cascaded parallel path in each layer pair. Each weave is comprised of two end turns, including a first weave end turn (e.g., 76 or 86) and a second weave end turn (e.g., 77 or 87). The weaves of each phase, and of each parallel path of such phase (e.g., each of paths 1, 2, 7 and 8 in FIGS. 4A and 4B), are all associated with either a first pole or a second pole in each of the layer pairs. For example, as shown in FIGS. 4A and 4B, all of the weaves of paths 1, 2, 7 and 8 are associated with a first pole residing at slots 42-44, and a second pole residing at slots 114-116. Stated differently, all of the weaves of paths 1, 2, 7 and 8 are located between either a first pole pair (i.e., the poles of slots 42-44 and 48-50) or a second pole pair (i.e., the poles of slots 114-116 and 120-122). It will be recognized that this results in a first set of weaves that are 180° opposed to a second set of weaves on the stator core 10 (i.e., the weave end turns 76 and 77 are directly opposite weave end turns 86 and 87 on the stator core). As such, the first set of weaves extend from slots that are 72 slots of the total 144 slots removed from the second set of weaves.

In addition to the above, it will be recognized that the winding arrangement 70 disclosed herein includes two sets of adjacent cascaded parallel paths per phase (e.g., paths 1 and 2 are a first set of adjacent cascaded parallel paths, and paths 7 and 8 are a second set of adjacent cascaded parallel paths). Moreover, each parallel path of each phase also has a complementary cascaded parallel path (e.g., path 7 is a complementary cascaded parallel path to path 1, and path 8 is a complementary cascaded parallel path to path 2). This arrangement results in each layer pair having four weaves. For example, at layer pair seven-eight, two weaves are associated with the pole of slots 42-44 (i.e., a first weave between path 1 and path 7 and a second weave between path 2 and path 8), and two weaves are associated with the pole of slots 114-116 (i.e., a first weave between path 1 and path 7 and a second weave between path 2 and path 8). When all of the layer pairs are considered, there are sixteen total weaves in the winding arrangement, including four weaves associated with each layer pair.

The foregoing winding arrangement results in a winding with exceptional layer balancing of the individual parallel wires. For each phase, each parallel wire is housed in the same average layer position as the other parallel wires, for all the slots of a slot type of all the poles. The winding includes more than N weaves for each parallel path per phase, wherein N is an even number greater than or equal to two. The weaves of each layer pair are also spaced equally apart. Moreover, the weaves for each layer pair are associated with the same poles.

Although the various embodiments have been provided herein, it will be appreciated by those of skill in the art that other implementations and adaptations are possible. For example, although the cascaded winding arrangement has been described herein as being formed from continuous conductors, it would also be possible to form the winding from segmented portions of wire. As another example, while the exemplary winding arrangement disclosed herein only includes two weaves for each pair of complementary cascaded parallel paths, additional weaves are also possible, such as three, four, or more. Additionally, it will be recognized that certain terms such as up, down, left, right, etc. are terms of convenience based on a particular orientation and viewpoint of the stator and that opposite or different terms may be used to describe the same embodiment of the stator, depending on perspective. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine comprising:

a stator core having a plurality of slots formed therein; and a multi-phase winding arrangement positioned on the stator core, the winding arrangement including:

a plurality of cascaded conductors arranged in layers of the slots, the layers defining multiple layer pairs, wherein the plurality of cascaded conductors form a plurality of parallel paths per phase, each of the parallel paths making multiple revolutions of the core, and wherein, for each layer pair, a number of weaves (N) are formed between a first parallel path and a second parallel path in said layer pair, wherein N is greater than or equal to two, wherein each weave is defined by an end loop configuration wherein the first parallel path switches layers with the second parallel path such that a first end loop of the first parallel path connects a first in-slot portion located in a first layer of a first slot to a second in-slot portion located in a second layer of a second slot and a second end loop of the second parallel path connects a third in-slot portion located in a second layer of the first slot to a fourth in-slot portion located in a first layer of the second slot.

2. The stator of claim 1, wherein the plurality of parallel paths per phase include four parallel paths per phase.

3. The stator of claim 2, wherein the plurality of paths per phase make multiple revolutions around the core with each revolution occurring within a layer pair.

4. The stator of claim 2, wherein the plurality of parallel paths per phase include a first set of adjacent cascaded parallel paths and a second set of adjacent cascaded parallel paths.

5. The stator of claim 4, wherein the first set of adjacent cascaded parallel paths are complementary cascaded parallel paths with the second set of adjacent cascaded parallel paths such that at poles of the winding arrangement the first set of adjacent cascaded parallel paths are arranged in different layers of each layer pair than the second set of adjacent cascaded parallel paths.

6. The stator of claim 4, wherein the first set and second set of adjacent cascaded parallel paths form a 4-8-4 pole pattern within the slots.

7. The stator of claim 1, wherein the cascaded parallel paths define a plurality of poles of the winding arrangement, and wherein, in a first layer pair, a first weave is associated with a first pole and a second weave is associated with a second pole, and in a second layer pair, a first weave is associated with the first pole and a second weave is associated with the second pole.

8. The stator of claim 7 wherein, in a third layer pair, a first weave is associated with the first pole and a second weave is associated with the second pole, and in a fourth layer pair, a first weave is associated with the first pole and a second weave is associated with the second pole.

9. The stator of claim 1, wherein the weaves of one layer pair are associated with a same set of poles as the weaves of all other layer pairs of the multiple layer pairs.

10. The stator of claim 1, wherein the layers include eight layers forming four layer pairs, and wherein one hundred and forty four slots are formed in the stator core.

11. A stator for an electric machine comprising:

a stator core having a plurality of slots formed therein; and a multi-phase winding arrangement positioned on the stator core and defining a plurality of poles, the winding arrangement including a plurality of cascaded conductors arranged in layers of the slots, the layers defining a plurality of layer pairs including a first layer pair and a second layer pair;

wherein the cascaded conductors form a plurality of parallel paths per phase in each of the layer pairs;

wherein a first plurality of weaves are formed between the parallel paths in the first layer pair, said first plurality of weaves associated with multiple poles of the plurality of poles including a first pole and a second pole; and wherein a second plurality of weaves are formed between said plurality of parallel paths in the second layer pair, said second plurality of weaves also associated with the first pole and the second pole;

wherein each weave of the first plurality of weaves and the second plurality of weaves is defined by an end loop configuration wherein a first parallel path of the plurality of parallel paths switches layers with a second parallel path of the plurality of parallel paths as a result of a first end loop of the first parallel path connecting a first in-slot portion located in a first layer of a first slot to a second in-slot portion located in a second layer of a second slot and a second end loop of the second parallel path connecting a third in-slot portion located in a second layer of the first slot to a fourth in-slot portion located in a first layer of the second slot.

12. The stator of claim 11, wherein the first pole and the second pole are 180° opposite one another on the stator core.

13. The stator of claim 11, wherein the first plurality of weaves are associated with the first pole via end loops extending between the first pole and another pole adjacent to the first pole, and wherein the first and second plurality of weaves are associated with the second pole via end loops extending between the second pole and another pole adjacent to the first pole.

14. The stator of claim 11, the layers further defining a third layer pair and a fourth layer pair, wherein a third plurality of weaves are formed between the parallel paths in the third layer pair, said third plurality of weaves also associated with the first pole and the second pole, and wherein a fourth plurality of weaves are formed between the parallel paths in the fourth layer pair, said fourth plurality of weaves also associated with the first pole and the second pole.

15. The stator of claim 11, wherein the plurality of parallel paths includes four parallel paths per phase in each of the layer pairs.

16. The stator of claim 15 wherein the four parallel paths are arranged to form a first set of adjacent cascaded parallel paths and a second set of adjacent cascaded parallel paths, wherein the first set of adjacent cascaded parallel paths are complementary cascaded parallel paths to the second set of adjacent cascaded parallel paths.

17. The stator of claim 1, wherein the plurality of parallel paths form a 4-8-4 pole pattern within the slots.

18. A stator for an electric machine comprising:

a stator core having a plurality of slots formed therein; and a multi-phase winding arrangement positioned on the stator core and defining a plurality of poles, the winding arrangement including:

a plurality of cascaded conductors arranged in layers of the slots, the layers defining multiple layer pairs, wherein the plurality of cascaded conductors form a plurality of parallel paths per phase, each of the parallel paths making multiple revolutions of the core with each revolution occurring within a layer pair, wherein, for each layer pair, a first weave and a second weave are formed between a first parallel path and a second parallel path in said layer pair, wherein the first weave is associated with a first pole of the plurality of poles, and wherein the second weave is associated with a second pole of the plurality of poles, wherein the first pole and the second pole are 180° opposite one another on the stator core, and wherein each weave of the first weave and the second weave is defined by an end loop configuration wherein a first parallel path of the plurality of parallel paths switches layers with a second parallel path of the plurality of parallel paths as a result of a first end loop of the first parallel path connecting a first in-slot portion located in a first layer of a first slot to a second in-slot portion located in a second layer of a second slot and a second end loop of the second parallel path connecting a third in-slot portion located in a second layer of the first slot to a fourth in-slot portion located in a first layer of the second slot.

19. The stator of claim 18, wherein the plurality of parallel paths includes four parallel paths per phase, wherein the four parallel paths are arranged to form a first set of adjacent cascaded parallel paths and a second set of adjacent cascaded parallel paths, and wherein the first set of adjacent cascaded parallel paths are complementary cascaded parallel paths to the second set of adjacent cascaded parallel paths.

20. The stator of claim 19 wherein the plurality of parallel paths form a 4-8-4 pole pattern within the slots.

* * * * *